June 1, 1954
C. L. MERSHON ET AL
2,680,215
WINDOW TEMPERATURE CONTROL
Filed March 17, 1950
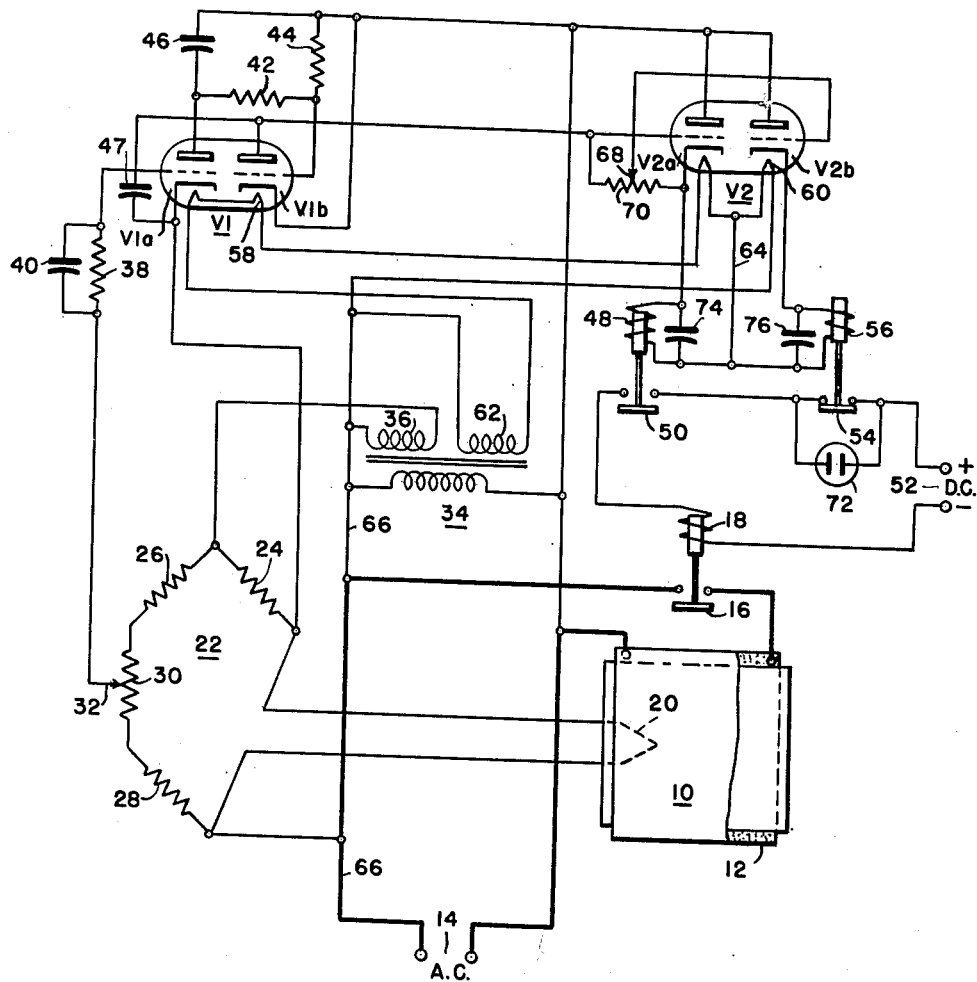
WITNESSES:
E. A. M'Closkey.
Ross Rogers Jr.
INVENTORS
Clarence L. Mershon and
George W. Nagel.
BY
Hymen Diamond.
ATTORNEY

Patented June 1, 1954

2,680,215

UNITED STATES PATENT OFFICE 2,680,215

WINDOW TEMPERATURE CONTROL

Clarence L. Mershon, Lima, Ohio, and George W. Nagel, Pittsburgh, Pa., assignors to Westinghouse Electric Corporation, East Pittsburgh, Pa., a corporation of Pennsylvania Application March 17, 1950, Serial No. 150,266

4 Claims. (Cl. 317—135)

This invention relates to electronic controls especially for automatic temperature regulation, and particularly to a system for controlling the supply of electrical energy for the heating of a body to maintain it at a desired temperature.

In general, the invention contemplates the provision of an electronic control for use in connection with electrically heated windows, such as aircraft windows or the like, and in which an electrical heating element is provided in heat exchanging relationship with a windowpane. In order to govern the supply of electrical energy to such heating element to maintain the window temperature at a desired value (for example to prevent the accumulation of ice thereon), it has been proposed to provide a temperature-sensing element also in heat exchange relation with the windowpane, and to control the supply of electrical power to the heating element in accordance with the existing temperature of the windowpane as sensed by the sensing element. In prior copending applications of Pridmore and Nagel, Serial No. 98,584, filed June 11, 1949, and Mershon, Serial No. 9,860, filed June 11, 1949, now abandoned, both assigned to the owner of the present application, a window heating and control system has been disclosed which is especially designed to discontinue the flow of heating energy to the windowpane upon various kinds of failure which may occur in the sensing element itself or in the electric circuit which controls the heater. These prior arrangements, for example, provide for discontinuation of the heating energy flow upon either short circuit or open circuit condition in the sensing element, as well as upon failure of the supply voltage to the control circuit and upon failure of the vacuum tube or tubes therein.

The actual operation of turning on and off the supply of electricity to the window heating element, in the above-mentioned applications as well as in numerous other systems of this general type, is accomplished by means of an electric relay whose contacts are opened and closed to open and close the supply circuit to the heating element. In all such prior arrangements of which we are aware, however, no provision has been made for the interruption of the supply of heating energy to the window heater in the event of the sticking of the relay contacts in circuit-closed condition. Since the sticking of relay contacts is of fairly common occurrence, and since the result of such sticking in systems of the type under consideration would usually result in serious overheating of the windowpane, it is highly desirable to provide the apparatus with means for interrupting the supply of heating energy before the heater itself or parts associated therewith are damaged.

It is accordingly a principal object of this invention to provide a window heating control with means for discontinuing the supply of electric energy to the heater element upon the occurrence of a sticking of the relay contacts.

It is a further object of the invention to provide a system of this type which will not interfere with the normal operation of the window temperature control; that is, one in which the supply of heating energy is interrupted by operation of the safety device only in response to a condition of the apparatus corresponding to a window temperature somewhat higher than that which can be attained by the window during normal operation of the electrical control circuit.

Still another object of the invention is to provide a safety arrangement of the above type in which the condition of sticking of relay contacts will not merely permanently interrupt the supply of heating energy to the window heater, but will interrupt such supply for a sufficient time to prevent damage to the window and its associated parts, and will then re-establish the supply of heating energy, this cycle being repeated indefinitely, or until the sticking contacts are released either fortuitously or by the intervention of personnel.

Still a further object of the invention is to provide a system of the above type with an alarm or indicator which will bring to the attention of operating personnel the fact that the device is operating with a condition of failure of contacts; that is, that the safety feature of the present invention is in fact in operation, so that corrective measures may be instituted promptly.

Ancillary objects of the invention are to provide the features outlined above in a form suitable for economical incorporation into existing control apparatus and which can be provided at low cost during the manufacture of such controls.

The above and other objects and advantages of the invention will best be understood by referring to the following detailed specification of a presently preferred embodiment thereof, taken in connection with the accompanying drawing, whose single figure is a schematic diagram of an apparatus incorporating the principles of this invention.

Referring now to the drawing, numeral 10 designates diagrammatically a window such as a window of an aircraft or other vehicle, the same being provided with a resistance-type electric heating element 12 which may conveniently be distributed about the area of said window (for example, by applying NESA coating to the glass surface or surfaces), which heating element is normally connected as at terminals 14 to a source of electric current for heating purposes, shown as an alternating-current line, the circuit to said source including the normally opened contacts 16 of an electromagnetic relay 18 which is operated under the control of a temperature-sensing element 20.

Sensing element 20 may desirably comprise a length of wire having a finite temperature coefficient of resistivity and arranged in heat conducting relation to the material comprising window 10. For the purpose of averaging out local variations in the temperature of said window, the sensing element 20 may desirably be distributed about the area of said window, it being understood that there is no electrically conductive connection between the heating element 12 and the sensing element 20.

In order to utilize the resistance of sensing element 20 to govern the application of heater power from a source 14 through contacts 16 to heating element 12, there is provided a Wheatstone bridge arrangement designated generally by numeral 22, one leg of which is constituted by sensing element 20 and the electrically conducting leads therefor. The remaining legs of the bridge are formed by resistors 24, 26 and 28, the last two of which are joined together by a series resistor 30 provided with a movable tap 32 which may be adjusted to balance out circuit variations and to set the controlled temperature of window 10 to a desired value.

A transformer 34 has its primary winding connected to the power supply terminals 14 (or to any equivalent alternating-current source) and is provided with a secondary winding 36 connected to one diagonal of bridge 22, for example, to the lower terminal of resistor 28 and to the junction between resistors 24 and 26. In accordance with well-established principles of bridge operation, any unbalance in the bridge network will be reflected in the form of a potential across the opposite diagonal of the bridge; that is, between tap 32 and the junction of resistor 24 and sensing element 20. Since the voltage supply for the bridge is an alternating voltage, the output voltage of the bridge when in unbalanced condition may conveniently be amplified by applying it to the grid of a vacuum tube amplifier V1a, which may be one portion of a dual triode tube such as an RMA type 12AX7, negative grid bias being provided by a resistor-condenser combination 38, 40 in a well-known manner. The space current of triode unit V1a is utilized to produce an amplified space current variation in triode unit V1b by the voltage drop in load resistor 44. The resistor 42 is used to decrease the gain of the amplifier. Decreasing gain decreases the number of times the relays are actuated and prolongs relay life. Numerals 46 and 47 designate smoothing condensers having the usual function.

The space current of triode unit V1b produces a variation in the potential in the control grid of the first triode unit V2a of a second dual triode vacuum tube which may be, for example, an RMA type 12AU7. In the cathode return lead of this triode V2a, there is connected the coil of an electromagnetic relay 48; normally open contacts 50 control the application of current to the operating coil of relay 18 from any convenient power source such as a direct-current source connected to terminals 52. This circuit includes also the contacts 54 of a relay 56 whose coil is in series with the cathode return circuit of the second triode section V2b, these contacts 54 being shown closed in the drawing since this is their condition during normal operation of the device in the absence of any sticking of the contacts 50 of relay 48. Under this normal condition, the control of the heating current relay 18 is exercised solely by relay 48 which is operated by the amplifier system described so as to connect the window heater 12 to the power supply circuit 14 whenever the window temperature drops below the predetermined value as sensed by sensing element 20.

The heaters for the cathodes of vacuum tubes V1 and V2 are indicated by numerals 58 and 60, and these are connected in series with a secondary winding 62 of transformer 34, as is well known in the art. In accordance with the teaching of the prior applications referred to above, the cathodes of vacuum tube V2 are returned as by a lead 64 and connection 66 to that side of supply line 14 which is not connected to the anodes of triode units V2a and V2b. This connection is not made direct, but is completed through a resistance (as here shown, the resistance of one of the heater elements of tube V2) which provides sufficient negative bias on the grids of the units V2a and V2b to reduce the space currents therein nearly to zero when these grids are brought to the potential of the lower side of the supply line, as occurs if sensing element 20 should be short-circuited.

It will be observed that the grid of triode unit V2b is connected to a tap 68 of a biasing resistor 70, so that for any given condition the grid of this triode unit V2b will be less negative than the grid of triode unit V2a. Thus, the first section of the tube with its grid more negative than that of the second section will cut off and deenergize relay 48 before relay 56 is deenergized. So long as contacts 50 are able to open to interrupt the supply of current to heater 12, therefore, relay 48 will determine the maximum temperature that will be allowed in window 10. Should contacts 50 stick or for any reason fail to open upon the normal drop of current through relay 48 corresponding to the desired maximum window temperature, heater power from terminals 14 will continue to be applied to heater 12 and the additional bridge unbalance will ultimately produce cutoff in the second triode section V2b, and the drop in current in the coil of relay 56 will cause opening of its contacts 54 so that relay 18 will be deenergized to cut off the supply of power to heater 12. In other words, if contacts 50 stick, control of the application of heating current is assumed by relay 56 and triode unit V2b, and the window heater will be cycled at a slightly higher secondary controlled temperature established by the difference in grid bias of units V2a and V2b in accordance with the setting of tap 68 on grid resistor 70. Whenever contacts 50 are restored to their operating condition, control of the window temperature will automatically be restored to relay 48.

In order to advise operating personnel of the fact that relay 56 has taken over control of the heating system, and so that corrective measures may be applied to contacts 50, a signal lamp or other form of alarm may be provided. This may conveniently take the form of a high impedance lamp 72 connected across the contacts 54 so that it will be lighted in the event of an opening of those contacts 54 in response to failure of contacts 56. The impedance of this indicator lamp must be such that it will not pass sufficient current to hold relay coil 18 energized. Where the voltage 52 is twenty-four volts, this lamp should be an ordinary twenty-four-volt filament lamp. Where the voltage is sufficient, a neon lamp or the like is suitable for this purpose. Obviously, however, any desired type of lamp or other indicator might equally well be provided and controlled by a separate set of contacts on relay 56.

Suitable circuit values which have been found to operate satisfactorily in the novel arrangement are as follows:

Resistors:
| | | |
|---|---|---|
| 24 | ohms | 300 |
| 26, 28 | do | 300 |
| 30 | do | 100 |
| 38 | megohm | 1 |
| 42 | do | 1 |
| 64 | ohms | 3300 |
| 70 | megohm | 1 |

Capacitors:
| | | |
|---|---|---|
| 40 | mfd | .01 |
| 46 | do | .01 |
| 48 | do | .01 |
| 76, 74 | do | .25 |
| Primary voltage (14) | volts | 115 |
| Secondary 62 voltage | do | 24 |
| Secondary 36 voltage | do | 15 |

Capacitors 74 and 76 are shown as connected across the coils of relays 48 and 56, respectively, these being chosen in accordance with well-known principles so as to smooth out variations in the currents through the coils and eliminate chattering of the contacts of these relays. The values of such capacitors, the parameters of the relay windings, and the like are to be chosen to suit the supply voltages employed in accordance with ordinary design considerations.

While the invention has been described in connection with a specific embodiment, it is to be understood that the principles thereof may be applied to apparatus of different forms without departing from the scope of the invention as defined in the appended claims.

We claim as our invention:

1. In an electronic control circuit of the type employing a sensing circuit capable of producing a control potential dependent on a condition being sensed and a control circuit comprising a first discharge device having an anode, a cathode and a control grid, means for impressing a first bias of a predetermined magnitude on said control grid, and a relay having its coil in series with the discharge path of said device and a pair of contacts in series with a controlled circuit, the improvement which comprises a second discharge device having an anode and a cathode connected in parallel with those of the first device and a control grid, means for impressing a second bias of a different magnitude than said first bias on said last-named control grid, means common to both said grids for impressing said control potential on both said grids and a relay having its coil in series with the space discharge path of said second device, the contacts of the last-named relay being connected in series with the contacts of the relay in the discharge path of the first device, one of said pairs of contacts being normally open and the other normally closed.

2. An electronic control circuit having an output stage comprising a first grid controlled discharge device, means for applying to the grid of said first device a first biasing potential, and a first relay having its actuating mechanism connected in the discharge path of said device and its contacts in series with a controlled circuit, the improvement which comprises a second grid controlled discharge device in parallel with the first discharge device, means for applying to the grid of said second discharge device a second biasing potential substantially lower than said first potential, a second relay having an actuating mechanism in series with the discharge path of the second discharge device, contacts of said second relay being connected in series with the contacts of the first relay and with said controlled circuit, the contacts of one of said relays being normally open and the contacts of the other normally closed, and means common to both said devices for impressing a control potential on the grids of both said devices.

3. An electronic control circuit having an output stage comprising a first grid controlled discharge device, means for applying to the grid of said first device a first biasing potential and a first relay having its coil connected in the discharge path of said device and a pair of normally open contacts in series with a controlled circuit, the improvement which comprises a second grid controlled discharge device in parallel with the first discharge device, means for applying to the grid of said second discharge device a biasing potential substantially less than the biasing potential applied to the first discharge device, a second relay having a coil in series with the discharge path of the second discharge device, a pair of normally closed contacts of said second relay connected in series with the contacts of the first relay and with said controlled circuit, and means common to both said grids for impressing a control potential on them.

4. In an electronic control circuit capable of delivering a control potential in accordance with the condition being sensed, a control circuit comprising a first discharge device having an anode, a cathode and a control grid, means for impressing a first biasing potential on said control grid, and a relay having its coil in series with the discharge path of said device and a pair of normally open contacts in series with a controlled circuit, the improvement which comprises a second discharge device having an anode and a cathode connected in parallel with those of the first device and a control grid, means for impressing a second biasing potential on said last-named control grid which is less negative than said first biasing potential, and a relay having its coil in series with the space discharge path of said second device and normally closed contacts connected in series with the contacts of the relay in series with the discharge path of the first device, and means common to both said control grids for impressing said control potential on both said grids.

References Cited in the file of this patent

UNITED STATES PATENTS

| Number | Name | Date |
|---|---|---|
| 1,128,081 | Vogel | Feb. 9, 1915 |
| 2,001,836 | Craig | May 21, 1935 |
| 2,150,265 | Conover | Mar. 14, 1939 |
| 2,225,346 | Pierre | Dec. 17, 1940 |
| 2,406,856 | Satterlee | Sept. 3, 1946 |
| 2,428,702 | Elliot | Oct. 7, 1947 |
| 2,509,497 | Hesson | May 30, 1950 |